United States Patent
Bye

(10) Patent No.: US 7,626,541 B2
(45) Date of Patent: Dec. 1, 2009

(54) ORIENTATION TRANSFER DEVICE AND METHOD

(75) Inventor: Charles T. Bye, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 1714 days.

(21) Appl. No.: 10/446,261

(22) Filed: May 23, 2003

(65) Prior Publication Data

US 2004/0257278 A1 Dec. 23, 2004

(51) Int. Cl.
*G01S 5/02* (2006.01)
*G01S 5/14* (2006.01)

(52) U.S. Cl. .............................. 342/357.11; 342/357.08

(58) Field of Classification Search ............ 342/357.02, 342/357.06, 357.08, 357.11, 357.13, 357.17; 701/213, 215
See application file for complete search history.

(56) References Cited

U.S. PATENT DOCUMENTS

| | | | |
|---|---|---|---|
| 3,752,587 A | 8/1973 | Myers et al. | |
| 5,557,347 A | 9/1996 | Johnson | |
| 7,225,548 B2 * | 6/2007 | Sieracki et al. | ............... 33/267 |
| 2007/0260394 A1 * | 11/2007 | Dean | ......................... 701/207 |
| 2008/0030330 A1 * | 2/2008 | Vock et al. | ............... 340/568.1 |

OTHER PUBLICATIONS

Army Field Manual, FM 17-12-7 Tank Gunnery Training Devices and Usage Strategies, Chapter 11, "Boresighting and Callibration Devices," May 1, 2000, 10 pages.
"Common Boresight Systems," DRS Technologies, http://www.drs.com/products/index.cfm?gID=428&subID=208&productID=167, Feb. 3, 2003, 4 pages.

* cited by examiner

*Primary Examiner*—Dao L Phan
(74) *Attorney, Agent, or Firm*—Fogg & Powers LLC

(57) ABSTRACT

A self-contained device and method provides that a first body or unit is held in, mounted on or otherwise place in a predetermined position relative to an orientation transfer device that determines its orientation and/or position. The orientation transfer device is mounted to, held in or by or otherwise placed in a predetermined position relative to a second body or unit and the second unit is moved to a position and/or orientation that is the same as that of the first body, or difference in position and/or orientation of the second body relative to the first body is determined, thereby establishing the orientation of the second body.

32 Claims, 3 Drawing Sheets

ORIENTATION TRANSFER DEVICE AND METHOD

BACKGROUND OF THE INVENTION

1. Field of the Invention

The present invention relates generally to a device and method for determining an orientation of a body and, in particular, to a device and method for transferring an orientation and/or distance from one body to another body using a battery powered GPS/INS (Global Positioning Satellite/Inertial Navigation System) with an RF (Radio Frequency) interface or an integral display.

2. Description of the Related Art

Various bodies and devices may need to be placed into a known or defined position and/or orientation. Navigation systems have been used to bore-sight an object to a known position. Navigation systems are generally bore-sighted by positioning the body of the navigation system at a predetermined position and orientation and then setting the sensed position to a predetermined setting. For example, aircraft equipment must be positioned in not only a predetermined horizontal position, but also positioned in a predetermined vertical angular position relative to other equipment on or to the aircraft axes.

It is known to calibrate the position or orientation of, for example, aiming sights for artillery, such as tank cannons, to the position of the cannon. This calibration is performed by bore-sighting apparatus, which utilize an optical apparatus mounted into the barrel of the cannon to view a target that is also being viewed in the artillery sight.

Another application of a bore-sighting apparatus is to orient items of equipment with respect to one another within the aircraft.

SUMMARY OF THE INVENTION

The present invention provides a device and method for determining an orientation and position of a first body or unit, and for duplicating the orientation of the first body by moving the second body to the orientation of the first body or unit, or for determining the difference in orientation and/or distance between the first body and the second body. The present device includes an orientation transfer device that is mounted in a mounting in the first body, determines the orientation and location thereof, is transferred to a mounting of the second body and carries the orientation and distance information of the first body to the second body and determines the difference in orientation and distance between the two bodies. In a preferred embodiment, the orientation transfer device is self contained.

DETAILED DESCRIPTION OF THE PREFERRED EMBODIMENTS

Figure 1:
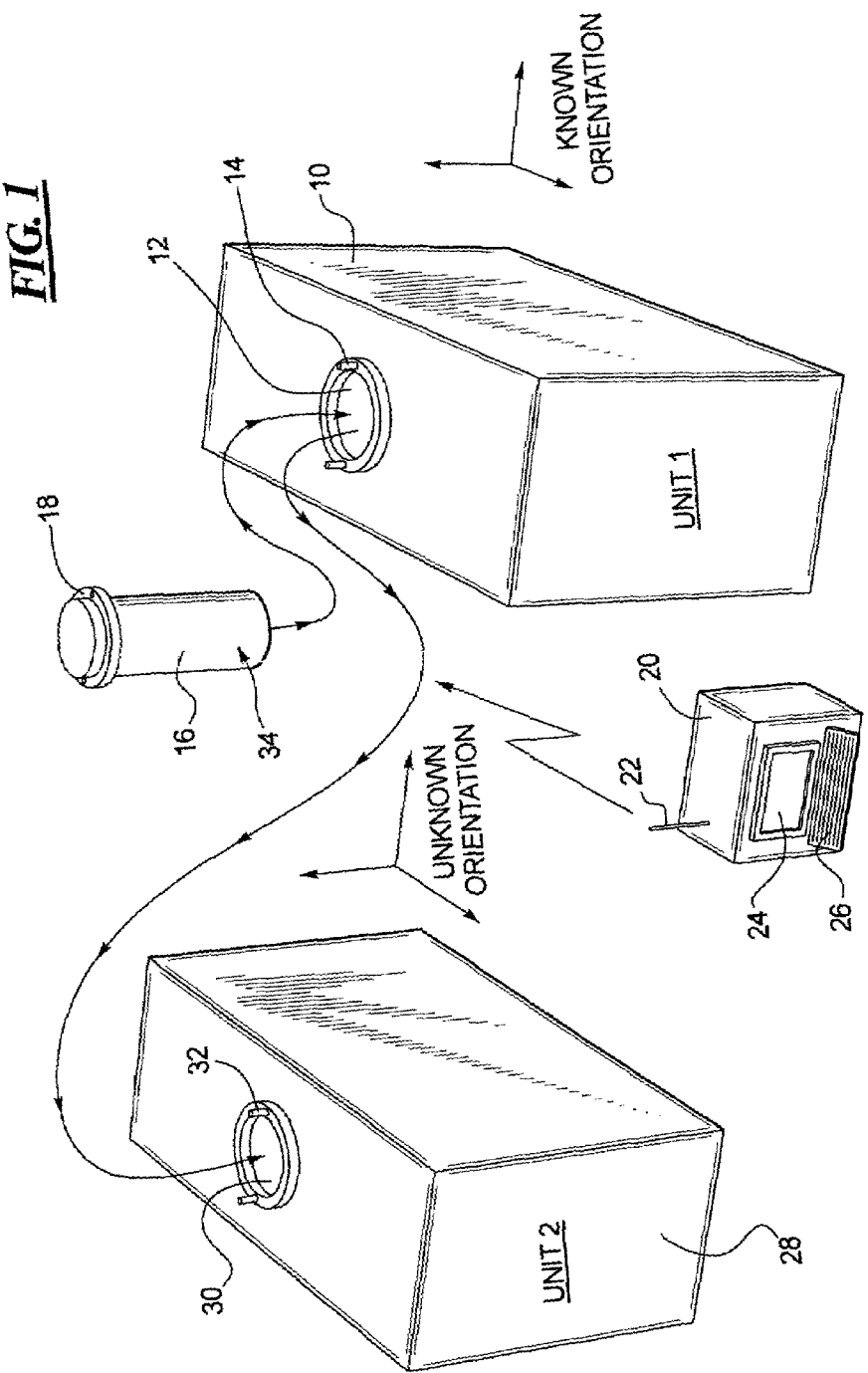
FIG. 1 is schematic perspective view of an orientation transfer device according to the present invention.

Referring first to FIG. 1, a body or unit 10 is provided in a known or arbitrary orientation or location and is stationary. If the orientation or location is not known, the orientation transfer device 16 will automatically determine the orientation and/or location of the body 10. The known orientation may include known latitude, longitude, altitude, pitch, roll or heading information. The body 10 has a receptacle opening 12 that is provided with a repeatable alignment structure 14. The repeatable alignment structure 14 of a preferred embodiment includes three alignment pins with machined surfaces. Other alignment structures are of course possible. It is also foreseeable that the receptacle opening 12 may be replaced by an alignment structure not having an opening, so long as a precise position relative to the body 10 is possible.

The body 10 may be any type of structure, including a vehicle with a navigation system in a predetermined known position or an aiming or targeting apparatus in a desired position. Alternatively, the body 10 may be fixed in position solely for purposes of bore-sighting the navigation system or orientation system.

An orientation transfer device 16 is provided. The orientation transfer device 16 has at least a portion thereof adapted to fit into the receptacle opening 12, or to be otherwise positioned at precise position relative to the known position of the body 10. The orientation transfer device 16 includes an inertial navigation system including inertial sensors and preferably is not connected to any external cabling for power or communication. The orientation transfer device may optionally include a GPS (Global Positioning Satellite) receiver. The device 16 may thus easily be transported from one location to another and used by simply placing the device at a desired position to be measured. No external connections are required. In the preferred embodiment, the orientation transfer device 16 is powered by a battery power supply and so there is no need for external connections to power. Within the device 16 is a Global Positioning System (GPS) for sensing global positioning satellites, as well as micro-electro-mechanical (MEM) inertial gyros, or sensors, and acceleration sensors. Other types of inertial sensors such as quartz-resonating accelerometers, or ring-laser gyros can be used in place of the MEM gyro or accelerometer. Also, other radio based navigation systems may be used such as Galileo, GLONASS (Global Orbiting Navigation Satellite System), or a local Time Of Arrival/Time Difference of Arrival (TOA/TDOA) system may be used. Further sensors may also be included, such as a magnetometer and a barometer as aiding devices. The orientation transfer device 16 also has a wireless transmitting and receiving system, such as a radio frequency (RF) transmitter/receiver or an infrared (IR) or other optical communication system for communicating data regarding position and orientation information.

The orientation transfer device 16 has openings or other fittings 18 for receiving the alignment pins 14 or other alignment devices of the receptacle opening 12 so that the orientation transfer device 16 may be removably positioned relative to the known position of the body 10. Other alignment structures are possible, including providing the alignment pins on the orientation transfer device 16 and openings or fittings for the pins in the body 10.

A display unit 20 has a wireless communication system operating to communicate with the wireless transmitting and receiving system of the orientation transfer device 16. For example, the preferred embodiment of the display unit 20 has a radio frequency transmitter/receiver operating on the same frequency as the radio frequency transmitter/receiver of the navigation system 16. An antenna 22 of the radio frequency transmitter/receiver is shown. The display unit 20 also has a display portion 24 on which data concerning the operation of the orientation transfer device 16 is displayed. Operating buttons, such as a touch pad, key pad or switches 26 for controlling the operation of the orientation transfer device 16 are also provided on the display unit 20.

As an alternative to the display 20, or in addition thereto, a display and operating controls may be provided integral to the orientation transfer device 16. The user of the orientation transfer device 16 may then view the settings and control the orientation transfer device 16 directly rather than remotely.

The orientation transfer device 16 is installed in the first body 10 and then the known orientation of the first body 10 is entered into the display unit 20 using the aided navigation setting. Alternatively, the orientation transfer device 16 can be commanded to automatically determine the position and orientation of the first body 10. The first body 10 is stationary and so the reference velocity is set or assumed to be zero. The attitude change measurement is also set or assumed to be zero. After a predetermined period of time, which may be about one minute, the mode of the orientation transfer device 16 is changed to navigate by control of the display unit 20.

A second body 28 is provided. The orientation of the second body 28 is unknown, but will be determined by the present invention. The second body 28 is shown as only one body but many such bodies may calibrated using the present invention and so the second body 28 may be considered as representative of multiple bodies. The second body 28 may be a vehicle or may be mounted in a vehicle. For example, the second body 28 may be mounted in an aircraft, a watercraft, or a land vehicle such as an automobile, truck, or military vehicle. The vehicle utilizing the second body 28 may be controlled by human operators, either as occupants or remotely, or may be robotically controlled. As an alternative, the first and second bodies may be artillery such as mortars, for example, and the orientation of a first artillery unit or a reference point may be transferred to a second artillery unit for targeting. A further application of the present device is to determine the relative position and/or orientation of machine components relative to one another. For example, a CNC (Computer Numeric Control) machine tool may have the relative positions of the machine tool head oriented and/or positioned relative to the work piece holder using the present orientation transfer device.

The second body 28 has a receptacle opening 30 with alignment structures 32 that are preferably substantially identical to the alignment structures 14 of the first body 10. The alignment structures 32, as in the first body, need not include a receptacle opening in every embodiment. Further, it is possible that the alignment structures are not substantially identical as between the first and second bodies 10 and 28, so long as precision alignment is possible with the orientation transfer device 16.

The orientation transfer device 16 is transferred to the second body 28 and is installed in the second body. In the preferred embodiment, the installation is accomplished by inserting a portion of the orientation transfer device 16 into the receptacle opening 30 and aligning it using the alignment structures 32. The mode of the orientation transfer device 16 is changed to aided navigation, and instructed to zero the velocity and attitude change using the aided navigation setting. After a short period of time, which in one embodiment is a few seconds, the orientation of the second body 28 relative to the first body 10 is determined and displayed. This information may indicate how the first and second bodies 10 and 28 are oriented relative to one another or are in or out of relative orientation or the geodetic orientation and position or the linear distance between the two bodies.

One possible use of the orientation transfer device 16 is to assist in moving the second body 28 to an orientation that is identical to the orientation of the first body 10.

The position of the orientation transfer device 16 relative to the second body 28 is thus known to a high degree of precision. The orientation transfer device 16 is thus able to determine the relative position and orientation of the first body 10 from the second body 28 and so precisely determines the position and orientation of the second body 28. The orientation of the second body 28 which was unknown is now known.

Thus, the present orientation transfer device 16 determines an orientation and position of the second body 28 relative to the first body 10. The distance between the two bodies is also determined. Accuracy of the relative orientation and distance between the two devices or their geodetic orientation and position can be improved by repeating the procedure without removing power from the device and not re-initializing the orientation transfer device 16.

The present device is free of cabling and other wired connections to the device for power or external sensors or controllers and so may be described as self contained. Specifically, the device may be operated without any external connections. In particular, the orientation system of the present device is self-contained, in that no external connections are required for operation. The power is supplied to the orientation portion from within the device by constructing the device of components which use little power and providing a battery power supply. Further, the sensor and sensor operating circuits are within the device so that no external connections are required. This is possible due to the compact nature of the components used. One aspect of the self-contained orientation system is the radio frequency communications which are provided to any external controller or display. The radio frequency or optical communications eliminates cabling which would otherwise be required. The power necessary to operate the device is supplied by a battery which makes the device self powered. The operation of the device is autonomous.

As an option, the device 16 may include connectors or contacts 34 by which power and/or data may be communicated between the device 16 and the units 10 and 28. For example, the connectors or contacts 34 may be computer serial connectors or may be surface contacts between the device 16 and the unit 28 so that the orientation transfer device 16 may receive power and so may operate in the unit 28 for an extended period of time and may communicate navigation data to the unit 28 and/or the vehicle in which the unit 28 is mounted.

Figure 2:
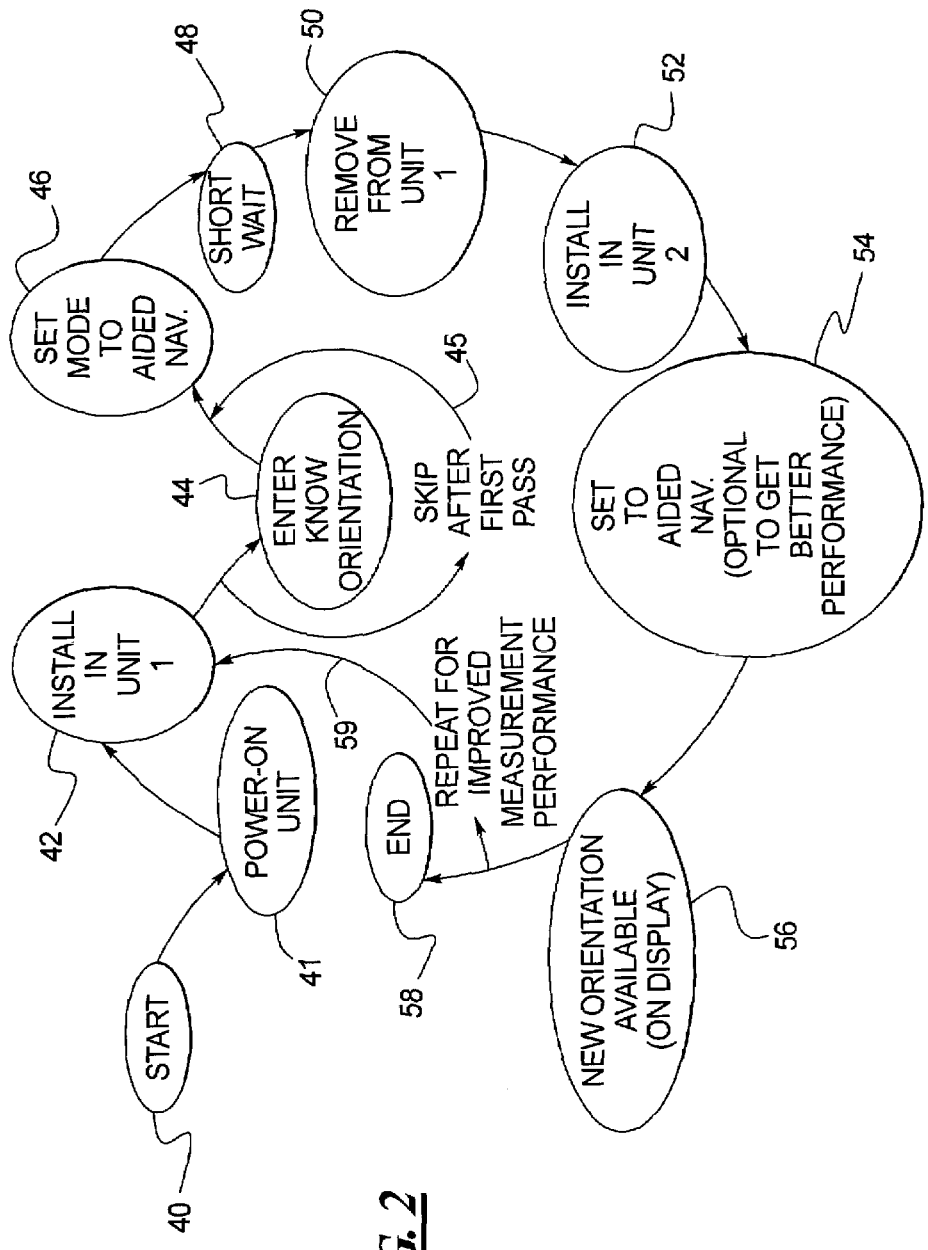
FIG. 2 is a flow chart of steps performed in utilizing the device of the present invention.

The operation of the present apparatus is set out in further detail in FIG. 2. In the method illustrated in the process flow chart, the process is begun at the start 40. The unit is turned on at step 41. At 42, the orientation transfer device 16 is installed in the first body 10. The known orientation of the first body 10 is entered into the orientation transfer device 16 at 44, for example, through operation of the wireless display unit 20. The step 44 of entering the known orientation may be bypassed as indicated at 45 if the orientation has been entered previously, such as in a prior pass through the process.

Alternatively, the orientation transfer device can be commanded to autonomously determine the orientation and location of the first body thus by-passing step 44. At 46, the operating mode of the orientation transfer device 16 is set to aided navigation. Step 46 is skipped if the unit is commanded to autonomously determine the orientation and location of the first body. It takes a short time for the orientation coordinates to be read and processed by the orientation transfer device 16, and so the present flow chart includes a short waiting time (step 48) of, for example, from one minute to ten minutes depending on the quality of the inertial sensors and the initialization data. The unit announces when step 48 is complete. The orientation transfer device 16 is then removed from the first body 10, at step 50.

Step 52 provides for the orientation transfer device 16 to be installed into the second body 28. At 54, the orientation transfer device 16 is set to aided navigation mode. The step 54 is optional, and provides better performance for the system. In step 56, the orientation of the second body 28 is available as a new orientation on the display body 20. The method ends at 58. Instead of ending, the process may be repeated, as indicated at 59, to improve the accuracy of the measurement.

Figure 3:
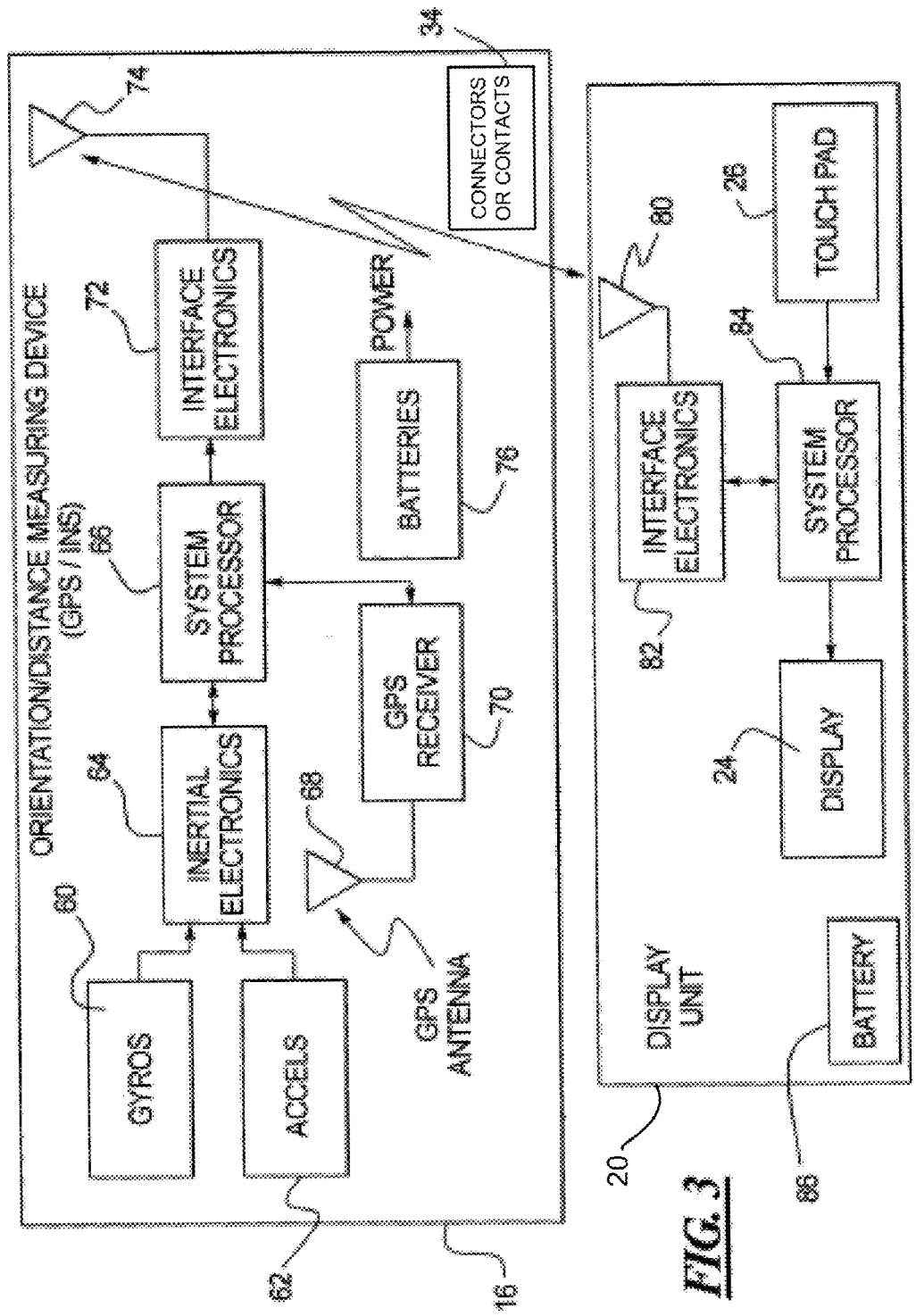
FIG. 3 is a functional block diagram showing operational components of the orientation measuring device and display unit of FIG. 1.

Further detail of the orientation transfer device 16 is provided in FIG. 3. The orientation transfer device 16 has gyros 60, for example, microelectronic inertial sensors, and accelerometers 62, which are also miniaturized electronic units. The quality of the sensors provided in the orientation transfer device 16 depends on the accuracy required of the orientation transfer. The output of the gyros 60 and accelerometers 62 are fed to an inertial electronics unit 64, which in turn communicates with a system processor 66. An antenna 68 is provided in the orientation transfer device 16, which is connected to an input of a GPS receiver 70. The GPS receiver 70 also is in communication with the system processor 66. Data is communicated from the system processor 66 through an interface electronics unit 72, for example a radio transmitter/receiver, and an antenna 74. A battery power supply 76 is also provided. As noted above, the device 16 may also have connectors or contacts 34 so that external power can be supplied to the device for extended use. The connectors or contacts 34 may also provide communication of navigation and/or positional and orientation data between the device 16 and external devices.

The display unit 20 is also shown in FIG. 3, including an antenna 80 for communication with the orientation transfer device 16. An interface electronics unit 82 is provided connected to the antenna 80. The display unit 20 has a system processor 84 which sends data to the display 24 and receives input from the touch pad or keypad 26. A battery 86 is also provided to supply power to the display unit.

As an alternative, the display unit may be built into the orientation transfer device. In particular, the display and keypad is provided in the orientation transfer device and the radio frequency communication components may be eliminated. Only a single battery and system processor are required in such an arrangement. As a further alternative, the orientation transfer device may have a display and keypad control built in to the unit for use when such local control is desirable, and it may also have a radio frequency communication system to communication with a remote display and control unit when remote control is desired.

Thus, an orientation of a first body may be transferred or referenced to a second body. The bodies may be aircraft or ships. It may be automobiles, trucks, trains, or other land vehicles. Another application for the present apparatus is for machine tools. Artillery may be positioned and oriented relative to a master unit or relative to other artillery units using the present invention. For example, an artillery unit that has been successfully aimed at a target can be the first body and further artillery units are the second bodies to which the aiming orientation is transferred. An example of one such artillery unit is a mortar, in which position and heading or orientation information is transferred between units.

Another application of the present invention is in determining the axes of an aircraft, for example, the x-axis of the aircraft and ensuring that equipment mounted in the aircraft is in alignment with that axis or with a reference point. A measurement of where the equipment is located relative to the reference axis or reference point of the aircraft is provided by the present invention. A known point or reference point is sometimes called a golden point.

The present device is in various embodiments small in size, battery powered, operable by wireless control, and self contained.

It is also contemplated that the relative orientation may be between any two bodies where the relative orientation information may be helpful. One such example is in construction. An orientation of a master unit of a building element is determined. Slave units of the building elements may then be positioned at precise positions and orientations relative to the master unit so that a building or other structure may be assembled of the slave units. A further possibility for use of the present invention is for surveying. Many other possibilities exist for applying the determination of an orientation relative to another orientation, such possibilities are within the scope of the present invention. Although other modifications and changes may be suggested by those skilled in the art, it is the intention of the inventors to embody within the patent warranted hereon all changes and modifications as reasonably and properly come within the scope of their contribution to the art.

I claim:

1. An apparatus for orientation and/or positioning of a body, comprising:
    a mounting portion constructed for removable positioning in a predetermined orientation and position on or in a first body, said mounting portion also being removably positionable in a predetermined orientation and position on or in a second body;
    a self-contained orientation portion having at least one of an orientation sensor, a location sensor and a movement sensor, said self-contained orientation portion being operable to determine a difference in at least one of orientation and distance between said first and second bodies after being removably positioned in the predetermined positions on or in said first and second bodies; and
    a power supply integral to said self-contained orientation portion, said power supply including a battery.

2. An apparatus as claimed in claim 1, wherein said mounting portion includes first and second portions that are selectively connectable to one another, said first portion being provided on said orientation portion and said second portion being provided on said first body and on said second body.

3. An apparatus as claimed in claim 1, wherein said mounting portion includes alignment pins.

4. An apparatus as claimed in claim 1, wherein said mounting portion includes an extended portion that extends into an opening in said first body, said extended portion being selectively removable from said first body and removably positionable into an opening in said second body.

5. An apparatus as claimed in claim 1, wherein said self-contained orientation portion includes a position sensor and inertial sensors.

6. An apparatus as claimed in claim 1, wherein said self-contained orientation portion includes inertial gyroscopes and accelerometers.

7. An apparatus as claimed in claim 6, wherein said self-contained orientation portion includes a Global Positioning Satellite (GPS) sensor as the position sensor.

8. An apparatus as claimed in claim 6, wherein said self-contained orientation portion includes a Galileo sensor as the position sensor.

9. An apparatus as claimed in claim 6, wherein said self-contained orientation portion includes a GLONASS sensor as the position sensor.

10. An apparatus as claimed in claim 6, wherein said self-contained orientation portion includes a Time Of Arrival/Time Difference of Arrival (TOA/TDOA) sensor as the position sensor.

11. An apparatus as claimed in claim 6, wherein said self-contained orientation portion includes a magnetometer.

12. An apparatus as claimed in claim 6, wherein said self-contained orientation portion includes a barometric altimeter.

13. An apparatus as claimed in claim 1, further comprising:
a display in communication with said self-contained orientation portion and operable to display at least one of position and velocity and orientation information.

14. An apparatus as claimed in claim 13, wherein said display is in wireless communication with said orientation portion, said wireless communication being one of radio frequency communication and optical communication.

15. An apparatus as claimed in claim 13, wherein said display is in wired communication with said self-contained orientation portion and is formed integrally with said orientation portion.

16. An apparatus as claimed in claim 1, further comprising:
a control portion in communication with said self-contained orientation portion.

17. An apparatus as claimed in claim 16, wherein said control portion is in wireless communication with said self-contained orientation portion.

18. An apparatus as claimed in claim 16, wherein said control portion is in wired communication with said self-contained orientation portion and integrally formed with said self-contained orientation portion.

19. An apparatus as claimed in claim 1, wherein said battery supplies power to said self-contained orientation portion during operation of said self-contained orientation portion.

20. An apparatus as claimed in claim 19, wherein said battery power supply is a sole source of power for said self-contained orientation portion.

21. An apparatus as claimed in claim 1, wherein said orientation portion includes an inertial navigation system which is initialized by said difference in at least one of orientation and distance between said first and second bodies.

22. An apparatus for initializing an inertial navigation system, comprising:
a mounting portion constructed for removable positioning in a predetermined orientation and position on or in a first body, said mounting portion also being removably positionable in a predetermined orientation and position on or in a second body; and
a self-contained orientation portion having inertial sensors and at least one of global positioning satellite sensors and magnetometer sensors, said self-contained orientation portion being operable to determine a difference in at least one of orientation and distance between said first and second bodies after being removably positioned in the predetermined positions on or in said first and second bodies, said difference being used to initialize the inertial navigation system.

23. An orientation transfer apparatus, comprising:
a mounting portion constructed for removably positioning in a predetermined orientation and position on or in a first body having a known position and orientation, said mounting portion also being removably positionable in a predetermined orientation and position on or in a second body; and
a self-contained orientation portion having inertial gyro sensors and accelerometers and global positioning satellite sensors, said self-contained orientation portion being operable to determine a difference in orientation and distance between said first and second bodies after being removably positioned in the predetermined positions on or in said first and second bodies, said difference in orientation and distance providing initialization information for guided inertial navigation of said second body.

24. A method for orientation and/or positioning of a body, comprising the steps of:
providing a first body at a position and orientation;
mounting a self-contained sensing device at a predetermined position on or in said first body;
determining at least one of an orientation and a position of the first body using said self-contained sensing device while said self-contained sensing device is mounted on or in said first body;
removing said self-contained sensing device from said first body;
mounting said self-contained sensing device at a predetermined position on or in a second body; and
sensing a difference in at least one of orientation and position of said second body relative to said first body using said self-contained sensing device.

25. A method as claimed in claim 24, wherein said step of providing said first body at a position and orientation provides said first body at a known position and orientation.

26. A method as claimed in claim 24, wherein said step of determining includes autonomously determining at least one of a position and velocity and an orientation of the first body.

27. A method as claimed in claim 24, further comprising: repeating the steps claimed in claim 24 without re-initializing the self-contained sensing device.

28. A method as claimed in claim 24, further comprising the step of: using said difference to initialize an inertial navigation system for said second body.

29. A method as claimed in claim 24, further comprising the step of: communicating wirelessly with said self-contained sensing device at least during said determining step.

30. A method as claimed in claim 24, further comprising the step of: communicating wirelessly with said self-contained sensing device at least during said sensing step.

31. A method as claimed in claim 24, wherein said sensing step includes sensing a global positioning satellite.

32. A method as claimed in claim 24, further comprising the step of: powering said sensing device from a battery power supply.

* * * * *

UNITED STATES PATENT AND TRADEMARK OFFICE
CERTIFICATE OF CORRECTION

PATENT NO. : 7,626,541 B2  Page 1 of 1
APPLICATION NO. : 10/446261
DATED : December 1, 2009
INVENTOR(S) : Charles T. Bye It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1957 days.

Signed and Sealed this

Second Day of November, 2010

David J. Kappos
*Director of the United States Patent and Trademark Office*